(12) United States Patent  (10) Patent No.: US 8,811,671 B2
Nakao  (45) Date of Patent: Aug. 19, 2014

(54) IMAGE PROCESSING APPARATUS, IMAGE PROCESSING METHOD, AND RECORDING MEDIUM

(71) Applicant: Fujitsu Limited, Kawasaki (JP)

(72) Inventor: Manabu Nakao, Kunitachi (JP)

(73) Assignee: Fujitsu Limited, Kawasaki (JP)

( * ) Notice: Subject to any disclaimer, the term of this patent is extended or adjusted under 35 U.S.C. 154(b) by 150 days.

(21) Appl. No.: 13/671,279

(22) Filed: Nov. 7, 2012

(65) Prior Publication Data

US 2013/0163863 A1  Jun. 27, 2013

(30) Foreign Application Priority Data

Dec. 26, 2011  (JP) ................................. 2011-284566

(51) Int. Cl.
*G06K 9/00* (2006.01)
(52) U.S. Cl.
USPC .......................................... 382/103; 382/201
(58) Field of Classification Search
CPC ........... G06T 2207/10016; G06T 2207/30232; G06T 2207/30241; G06T 2207/30196; G06T 7/0028; G06T 7/20; G06T 2207/20144; G06T 7/2006; G06K 2009/3291; G06K 9/00342; G06K 9/00771; G06K 9/32; G06K 9/6252
See application file for complete search history.

(56) References Cited

U.S. PATENT DOCUMENTS

| | | | | |
|---|---|---|---|---|
| 6,674,877 | B1* | 1/2004 | Jojic et al. | 382/103 |
| 7,200,266 | B2* | 4/2007 | Ozer et al. | 382/173 |
| 8,660,365 | B2* | 2/2014 | Lukas et al. | 382/206 |
| 2004/0175058 | A1* | 9/2004 | Jojic et al. | 382/305 |
| 2007/0053557 | A1* | 3/2007 | Cahill et al. | 382/128 |
| 2008/0262772 | A1* | 10/2008 | Luinge et al. | 702/94 |
| 2009/0153730 | A1* | 6/2009 | Knee et al. | 348/445 |
| 2009/0231436 | A1* | 9/2009 | Faltesek et al. | 348/169 |
| 2010/0073686 | A1* | 3/2010 | Medeiros et al. | 356/615 |
| 2011/0116684 | A1* | 5/2011 | Coffman et al. | 382/103 |
| 2011/0142282 | A1* | 6/2011 | Srikrishnan et al. | 382/103 |

FOREIGN PATENT DOCUMENTS

JP  1-315884  12/1989

* cited by examiner

*Primary Examiner* — Jingge Wu
(74) *Attorney, Agent, or Firm* — Fujitsu Patent Center

(57) ABSTRACT

A processor of an image processing apparatus designates a target region. When an image is divided into a plurality of small regions which are smaller than a target region, the processor calculates a centroid obtained by weighting the central coordinates of each of the plurality of small regions by a likelihood of each of the plurality of the small regions and calculates a covariance matrix that depends on the centroid, the likelihood being based on characteristic value histograms of respective small regions inside and outside the target region. The processor detection unit detects a degree of separation according to a histogram, a likelihood, a centroid, and a covariance matrix. The processor also determines a post-update target region according to a degree of separation.

14 Claims, 11 Drawing Sheets

F I G. 9A
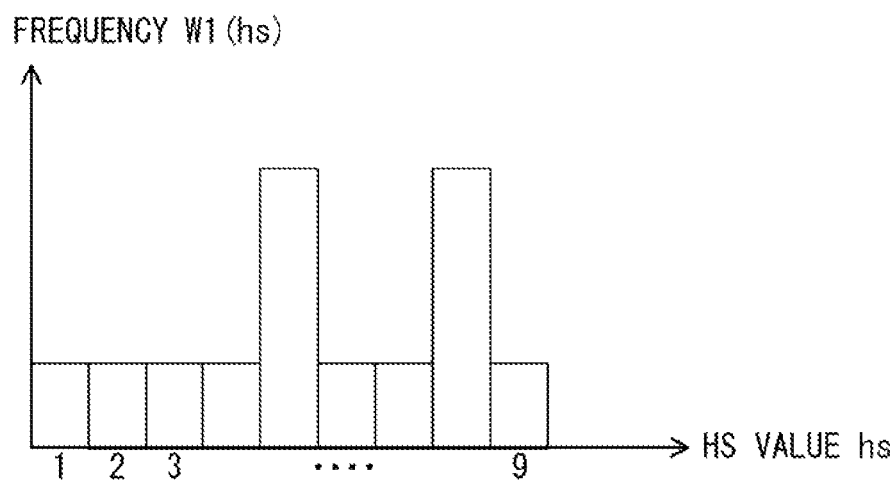
F I G. 9B
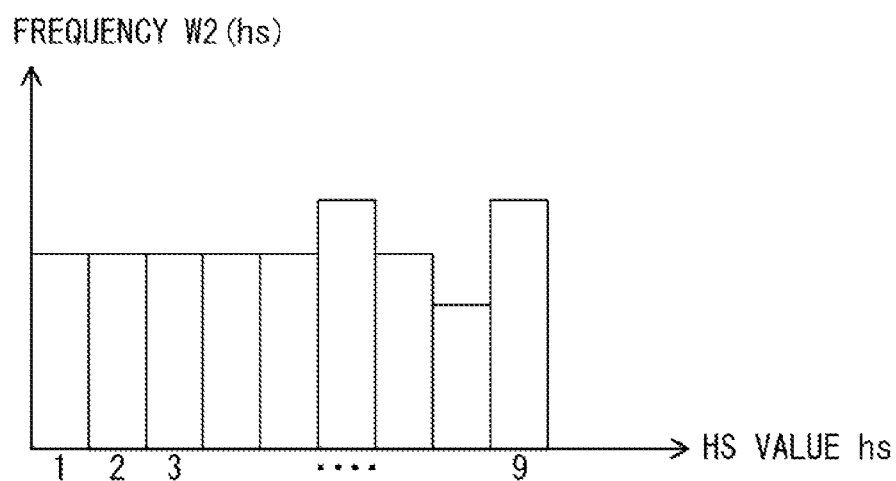

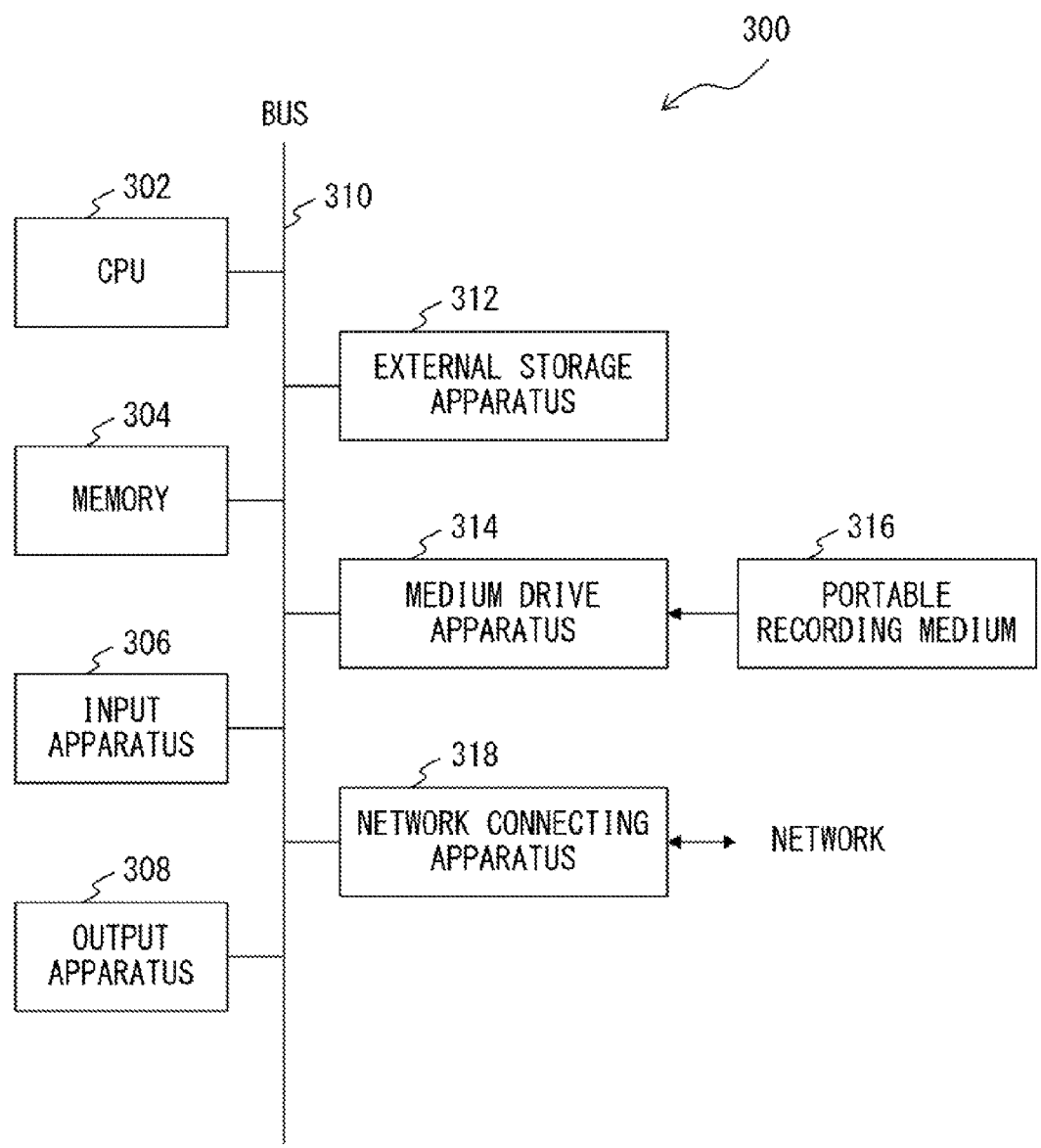
F I G. 1 1

IMAGE PROCESSING APPARATUS, IMAGE PROCESSING METHOD, AND RECORDING MEDIUM

CROSS-REFERENCE TO RELATED APPLICATION

This application is based upon and claims the benefit of priority of the prior Japanese Patent Application No. 2011-284566, filed on Dec. 26, 2011, the entire contents of which are incorporated herein by reference.

FIELD

The embodiments discussed herein are related to an image processing apparatus, an image processing method, and a recording medium.

BACKGROUND

A system has been used which tracks a photographed target using template matching for applications, e.g., confirmation of safety within a building and monitoring for finding of defectiveness of a product. In such a system, when a camera that shoots an image moves or when a photographed target moves, how the image of the target looks changes. Accordingly, a transforming target would be traced, and hence a template to be used needs to be automatically updated.

As an example, there is an example in which, when a desired pattern is indicated in one frame of an input moving image, a pattern that is the most similar to the indicated pattern is detected in another frame. A method is known in which a detected pattern is replaced with an indicated pattern to update a template, and patterns are detected repeatedly to trace a desired target.

Patent document 1: Japanese Laid-open Patent Publication No. 1-315884

SUMMARY

An image processing apparatus in accordance with one aspect comprises a processor. The processor designates a target region. When an image is divided into a plurality of small regions which are smaller than a target region, the processor calculates a centroid obtained by weighting the central coordinates of each of the plurality of small regions by a likelihood of each of the plurality of the small regions and calculates a covariance matrix that depends on the centroid, the likelihood being based on characteristic value histograms of respective small regions inside and outside the target region. The processor detects the degree of separation according to a histogram, a likelihood, a centroid, and a covariance matrix. The processor also determines a post-update target region according to the degree of separation.

In an image processing method in accordance with another aspect, a target region is designated. When an image is divided into a plurality of small regions which are smaller than a target region, a centroid obtained by weighting the central coordinates of each of the plurality of small regions by a likelihood of each of the plurality of small regions is calculated, and a covariance matrix that depends on the centroid is calculated, the likelihood being based on characteristic value histograms of respective small regions inside and outside the target region. The degree of separation is detected according to a histogram, a likelihood, a centroid, and a covariance matrix, and the method is characterized in that a post-update target region is determined according to the degree of separation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 9A illustrates an example of a histogram of HS values inside a target region in accordance with the second embodiment.

FIG. 9B illustrates an example of a histogram of HS values outside a target region in accordance with the second embodiment.

FIG. 11 illustrates a configuration of a typical computer.

DESCRIPTION OF EMBODIMENTS

The aforementioned conventional amplifier circuit has problems as follows.

In a method for tracking a target by automatically updating a template as described above, when, for example, the size of the target or the direction to the target changes enormously, the target may not be able to be tracked in some cases. When an illumination condition or the like for a target changes, the brightness of the entire screen changes, and hence the target may not be extracted in the updated template. Moreover, depending on a setting of the template, the target may be lost sight of.

Preferred embodiments of the present invention will be explained with reference to accompanying drawings.

Figure 1:
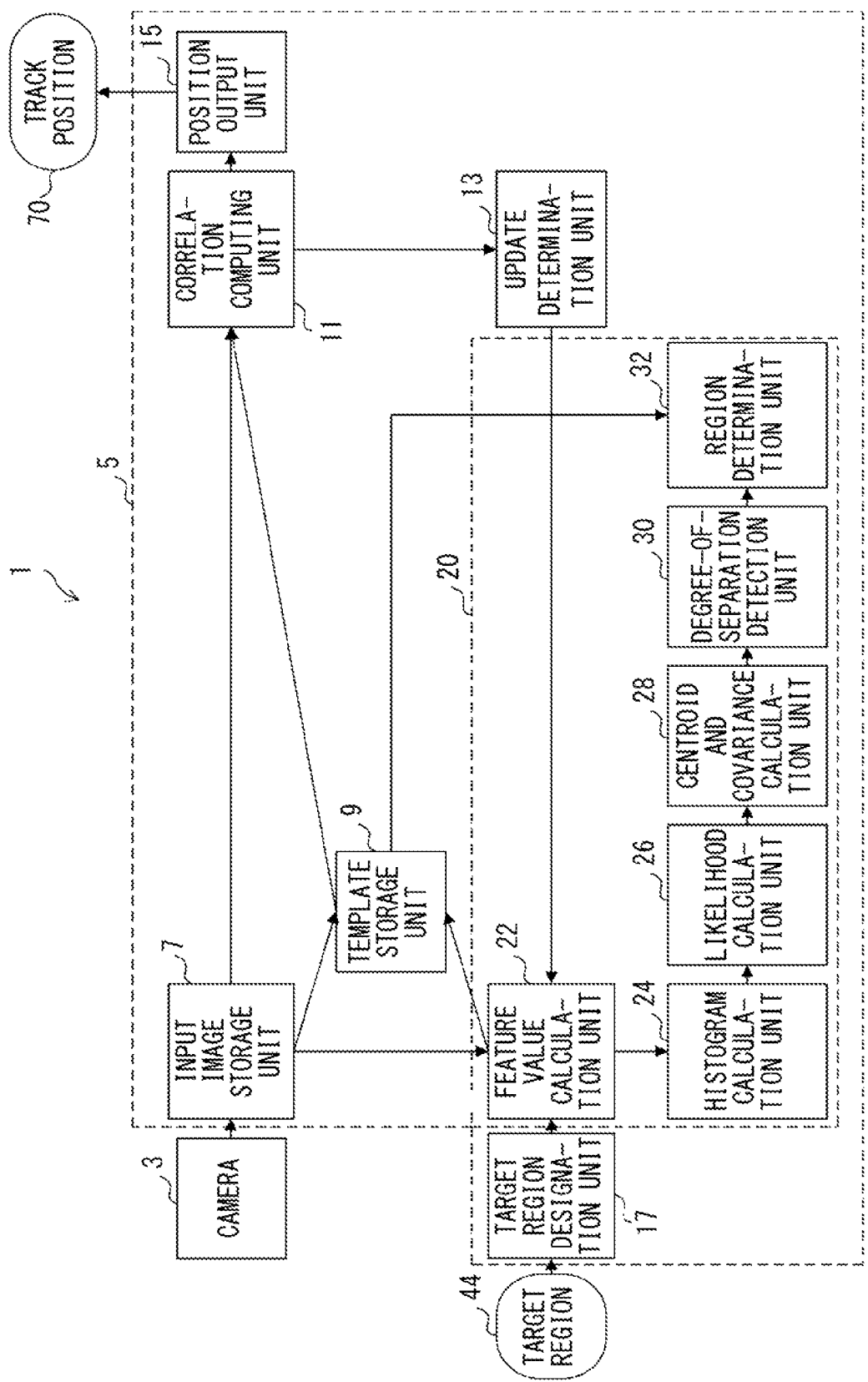
FIG. 1 illustrates a configuration of an image processing system in accordance with a first embodiment.

(First embodiment) In the following, an image processing system 1 in accordance with a first embodiment will be described with reference to the drawings. FIG. 1 illustrates a configuration of the image processing system 1 in accordance with the first embodiment. As illustrated in FIG. 1, the image processing system 1 includes a camera 3 and an image processing apparatus 5. The camera 3 is an image taking apparatus that is provided with, for example, a solid state imaging device and that is capable of taking moving images.

The image processing apparatus 5 includes an input image storage unit 7, a template storage unit 9, a correlation computing unit 11, an update determination unit 13, a position output unit 15, a target region designation unit 17, and a template update unit 20. The input image storage unit 7 is a storage apparatus which stores an image taken by the camera 3. The template storage unit 9 is a storage apparatus which stores a template that serves as a reference image used to track a target.

The correlation computing unit 11 computes a correlation between a template and a taken image. According to the correlation computed by the correlation computing unit 11, the update determination unit 13 determines whether or not a change has been made in the image. Upon detection of a change in the image in view of a decrease in the correlation, the update determination unit 13 determines to update the template. When the correlation computing unit 11 calculates a correlation that is as great as or greater than a predetermined correlation, the position output unit 15 specifies and outputs the position of the target. The target region designation unit 17 designates, as a target region, a region input by, for example, a keyboard or a mouse apparatus.

The template update unit 20 includes a characteristic value calculation unit 22, a histogram calculation unit 24, a likelihood calculation unit 26, a centroid and covariance calculation unit 28, a degree-of-separation detection unit 30, and a region determination unit 32. The characteristic value calculation unit 22 divides an image stored by the input image storage unit 7 into a plurality of regions, as will be described hereinafter, and calculates a characteristic amount for each region. The histogram calculation unit 24 calculates histograms of the characteristic amounts calculated by the characteristic value calculation unit 22 for the inside and outside of the target region designated by the target region designation unit 17.

According to the histograms of the characteristic amounts calculated by the histogram calculation unit 24, the likelihood calculation unit 26 calculates likelihoods. According to a result of weighting the plurality of regions by the likelihoods calculated by the likelihood calculation unit 26, the centroid and covariance calculation unit 28 calculates a centroid and a covariance matrix. The degree-of-separation detection unit 30 detects a Mahalanobis distance that has the largest difference in the degree of separation between an inside and an outside a region which is a predetermined distance from the centroid calculated by the centroid and covariance calculation unit 28. According to the Mahalanobis distance detected by the degree-of-separation detection unit 30, the region determination unit 32 decides on a region that should be the next template and causes the template storage unit 9 to store the template that has been decided on.

Processes performed by the image processing system 1 configured as described above will be described with reference to FIG. 2 to FIG. 6. In the present embodiment, brightness dispersions are used as a characteristic amount used to update a template. Brightness dispersions are preferably adopted when an image includes a difference between a change in a brightness of a target and a change in a brightness of the other portions, e.g., in the case of tracking a ship on a sea surface. In an example of ship tracking, a ship includes many edges and corners and thus makes a great change in the brightness, and, by contrast, the sea surface includes many uniform patterns and thus makes only a slight change in the brightness; accordingly, brightness dispersions are used as characteristic amounts.

Figure 2A:
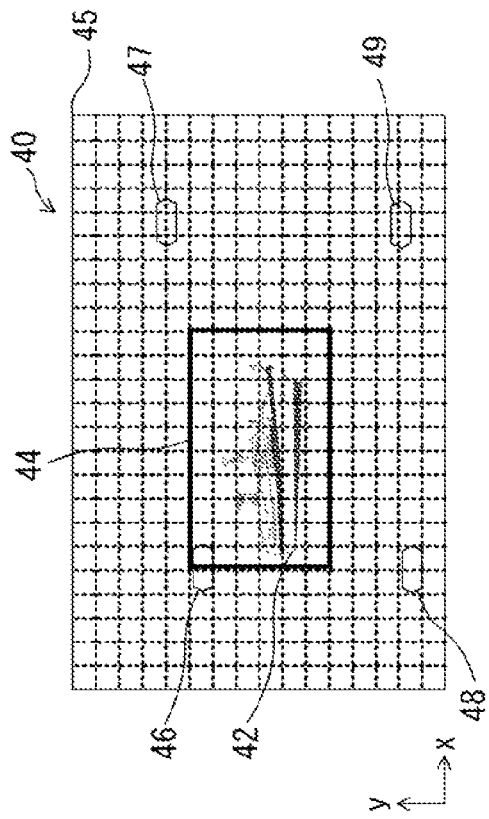
FIG. 2A illustrates an example of designation of a target region of an image in accordance with the first embodiment.
Figure 2B:
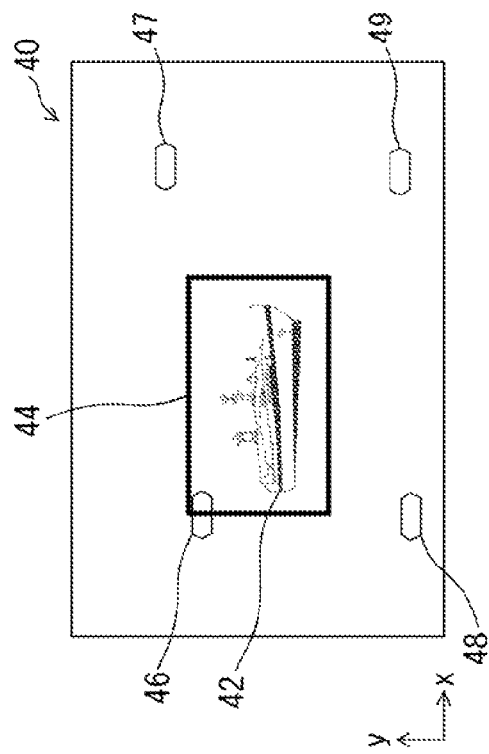
FIG. 2B illustrates an example in which an image is divided into a plurality of small regions in accordance with the first embodiment.

FIG. 2 illustrate an image in accordance with the first embodiment, wherein FIG. 2A illustrates an example of designation of a target region, and FIG. 2B illustrates an example in which the image is divided into small regions. As illustrated in FIG. 2A, first, by using, for example, a mouse apparatus (not illustrated), a user sets up, within an image 40 displayed by a display apparatus (not illustrated), a rectangular region surrounding a target 42 desired to be traced. In the image processing system 1, the target region designation unit 17 designates the rectangular region designated by the user as a target region 44.

As illustrated in FIG. 2B, the characteristic value calculation unit 22 divides the image 40 into a plurality of small regions 45 that are centered around the coordinates (x, y) and that are smaller than the target region 44, and calculates a brightness dispersion Var (x,y) for each small region 45 in accordance with the following formula 1.

$$\mathrm{Var}(x, y) = \left(\frac{1}{N}\sum_{k=1}^{N} v(k)^2\right) - \left(\frac{1}{N}\sum_{k=1}^{N} v(k)\right)^2 \quad \text{(Formula 1)}$$

In formula 1, N represents the number of pixels of a small region 45, and v(k) represents a brightness value of the k-th pixel (k is an integer from 1 to N) from among pixels of the small region 45 to which the numbers 1 to N are assigned for convenience. A brightness value is, for example, a gradation value of a brightness signal of each pixel.

Figure 3A:
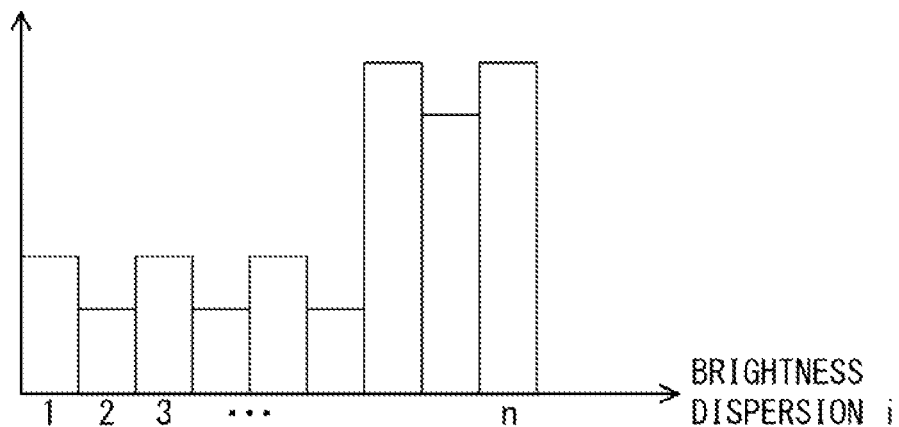
FIG. 3A illustrates an example of a histogram of brightness dispersions inside a target region in accordance with the first embodiment.
Figure 3B:
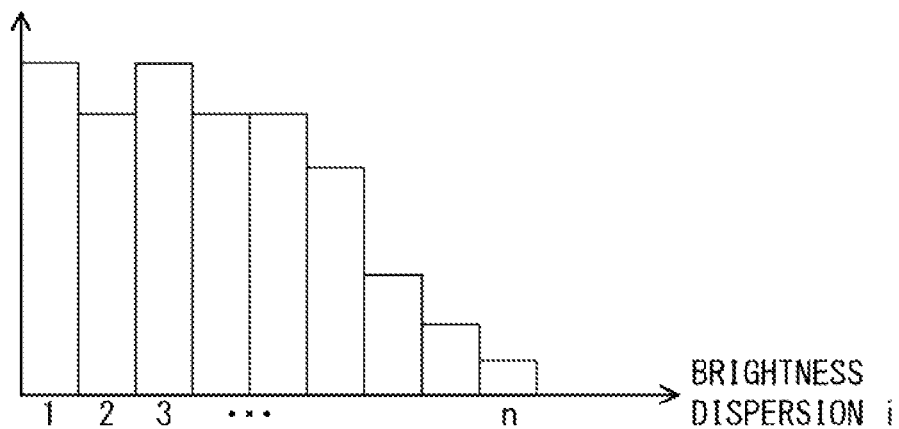
FIG. 3B illustrates an example of a histogram of brightness dispersions outside a target region in accordance with the first embodiment.

Next, the histogram calculation unit 24 determines brightness dispersion histograms of the small regions 45 for inside and outside of the target region 44. FIG. 3 illustrate examples of brightness dispersion histograms, wherein FIG. 3A illustrates the histogram for inside the target region 44, and FIG. 3B illustrates the histogram for outside the target region 44.

In FIG. 3, the horizontal axis represents a brightness dispersion i and the vertical axis represents a frequency. The brightness dispersion i is represented by the numbers 0 to n (n is an arbitrary integer) assigned to ranges each with a predetermined value, the ranges being divisions of the brightness dispersion Var (x,y) calculated by formula 1. As an example, brightness dispersion i=1 is assigned to the range of brightness dispersion Var (x,y)=0 to Var1, brightness dispersion i=1 is assigned to the range of brightness dispersion Var (x, y)=Var1 to Var2, and so on. The frequency is represented as the number of small regions 45 corresponding to each of the brightness dispersions i which is normalized so that the sum of the small regions 45 within the calculation-target region becomes "1". Frequency W1(i) indicates a frequency in the case of the inside of the target region 44 being a calculation target, and frequency W2(i) indicates a frequency in the case of the outside of the target region 44 being a calculation target.

FIG. 4B illustrates a likelihood ρ(i) of each brightness dispersion. The likelihood calculation unit 26 calculates a likelihood ρ(i) in accordance with the following formula, 2.

$$\rho(i) = \ln(W1(i)/W2(i)) \quad \text{(Formula 2)}$$

Figure 4:
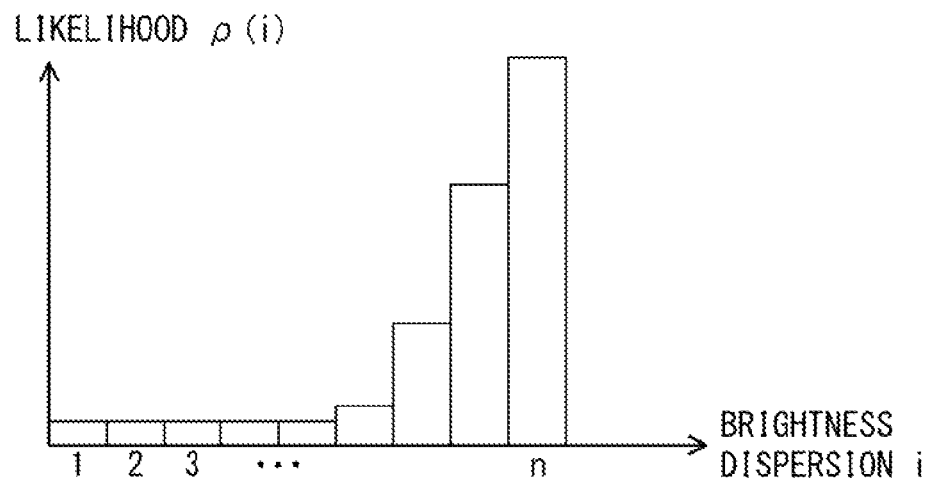
FIG. 4 illustrates a likelihood of each brightness dispersion in accordance with the first embodiment.

In FIG. 4, the horizontal axis represents a brightness dispersion i. The vertical axis indicates a likelihood ρ(i) calculated by the formula 2 above in accordance with the brightness dispersion i.

Next, using the likelihood ρ(i) calculated by formula 2, the centroid and covariance calculation unit 28 determines a centroid weighted by the likelihoods ρ(i) of the central coordinates of the small regions 45 within the target region 44, and determines a covariance matrix. That is, the centroid and covariance calculation unit 28 assigns, to the central coordinates (x,y) of each small region 45, a likelihood ρ(i) calculated by formula 2 according to the brightness dispersion of each small region 45. As an example, when the brightness dispersion Var (xp,yp) of the central coordinates (xp,yp) of a small region 45 to which the number p (p is an integer that is one or greater) is assigned for convenience belongs to, for example, i=1, the centroid and covariance calculation unit 28 assigns the likelihood ρ(1) corresponding to i=1 to central coordinates (xp,yp). The likelihood ρ(i) corresponding to the central coordinates (xp,yp) will hereinafter be referred to as a likelihood ρ(p). When the number of small regions 45 within the target region 44 is M (M is a positive integer), p is an integer that is 1≤p≤M. Accordingly, the coordinates (xg,yg) of the centroid are calculated by the following formula 3.

$$xg = \frac{\sum_{p=1}^{M}(xp \times \rho(p))}{\sum_{p=1}^{M} \rho(p)} \quad \text{(Formula 3)}$$

$$yg = \frac{\sum_{p=1}^{M}(yp \times \rho(p))}{\sum_{p=1}^{M} \rho(p)}$$

In this case, a covariance matrix A is calculated in accordance with the following formula 4.

$$A = \begin{bmatrix} E[(xp-xg)(xp-xg)] & E[(xp-xg)(yp-yg)] \\ E[(yp-yg)(xp-xg)] & E[(yp-yg)(yp-yg)] \end{bmatrix} \quad \text{(Formula 4)}$$

In accordance with the following formulae, 5 and 6, the degree-of-separation detection unit 30 calculates a Mahalanobis distance d from the centroid (coordinates (xg,yg)) to the central coordinates (xp,yp) of each small region 45.

$$B = \begin{pmatrix} xp \\ yp \end{pmatrix} \quad \text{(Formula 5)}$$

$$G = \begin{pmatrix} xg \\ yg \end{pmatrix}$$

$$d = \sqrt{(B-G)^T A^{-1}(B-G)} \quad \text{(Formula 6)}$$

Figure 5:
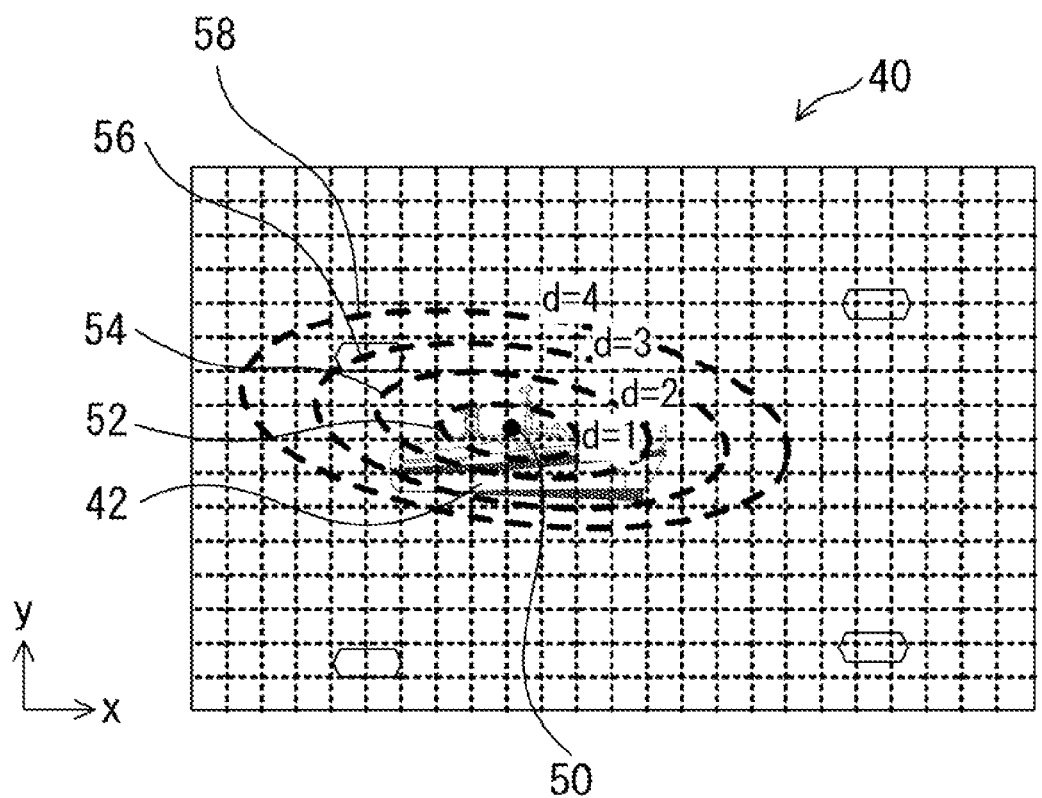
FIG. 5 is an example illustrating a plurality of Mahalanobis distances in accordance with the first embodiment.

FIG. 5 is an example illustrating regions of Mahalanobis distances d=1, 2, . . . , D (in the following example, 4 will be used as D, and hence Mahalanobis distances d=1, 2, 3, 4) according to the Mahalanobis distances d calculated as described above. As illustrated in FIG. 5, the region of the Mahalanobis distance d=1 to a centroid 50 is represented as a region 52. Similarly, the regions of the Mahalanobis distances d=2, 3, 4 are represented as regions 54, 56, 58, respectively.

For the selected Mahalanobis distances d=1, 2, 3, 4, the degree-of-separation detection unit 30 performs the following processes. That is, the degree-of-separation detection unit 30 judges, to be included in a target region, a region which has a Mahalanobis distance d that has been calculated for the central coordinates (xp, yp) of a small region 45 and that is equal to or less than a distance selected from the Mahalanobis distances d=1 to 4, and the degree-of-separation detection unit 30 judges, to be located outside the target region, a region exceeding the selected distance. The degree-of-separation detection unit 30 then performs processes similar to those described with reference to FIG. 2 and FIG. 3 above. That is, the degree-of-separation detection unit 30 determines a frequency Wd1(i) for the brightness dispersion histogram of the small regions 45 inside the target region (the total sum of frequencies is normalized by 1) and a frequency Wd2 for the brightness dispersion histogram of the small regions 45 outside the target region (the total sum of frequencies is normalized by 1).

Next, using the obtained results, the degree-of-separation detection unit 30 determines a degree of separation α(d) of brightness histograms according to the frequency Wd1(i) and the frequency Wd2(i). The degree of separation α(d) is determined in accordance with the following formula 7.

$$\alpha(d) = 1 - \sum_{i=1}^{n} \sqrt{Wd1(i) \times Wd2(i)} \quad \text{(Formula 7)}$$

The degree-of-separation detection unit 30 performs the aforementioned processes according to a plurality of Mahalanobis distances d (d=1, 2, 3, 4, in this example), calculates the degrees of separation α(d) calculated by formula 7, and determines a degree-of-separation maximum distance dmax, which is a Mahalanobis distance with the maximum degree of separation α(d) from among the calculated degrees of separation α(d).

Figure 6:
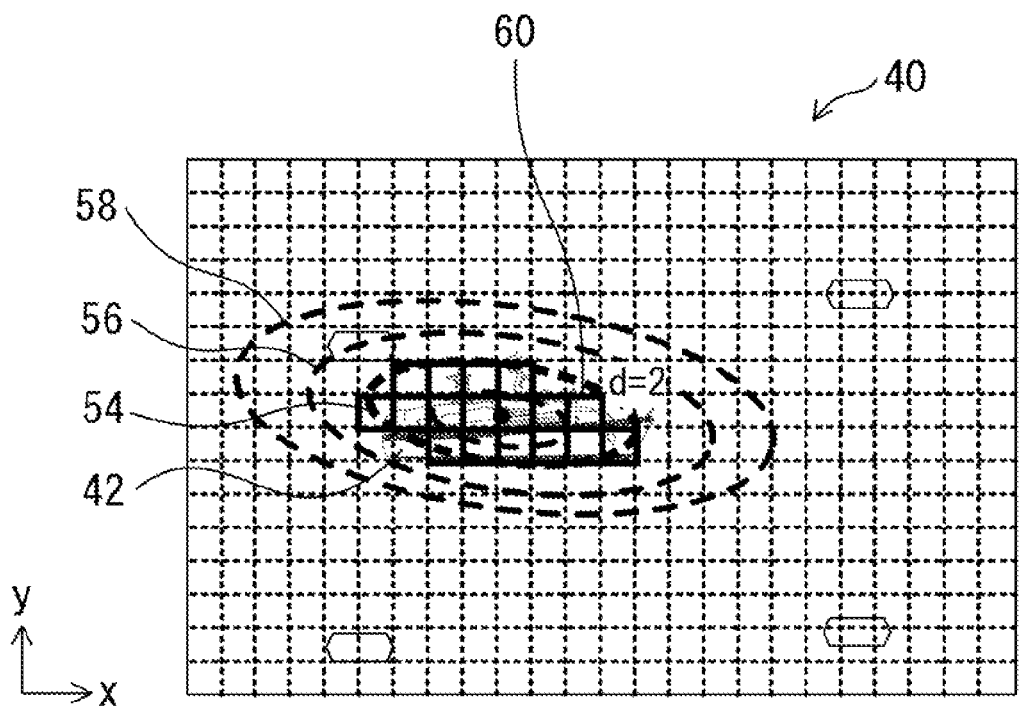
FIG. 6 illustrates an example of a degree-of-separation maximum distance in accordance with the first embodiment.

FIG. 6 illustrates an example of a degree-of-separation maximum distance dmax. As illustrated in FIG. 6, in this example, the degree-of-separation maximum distance dmax=2, and the region 54 corresponds to this distance. The image processing apparatus 5 defines the region 54 as a new target region.

In addition, the target region designation unit 17 designates, as a new target region 44, the region 54 that is a new target region extracted via the aforementioned processes, and the target region designation unit 17 performs the aforementioned processes again from the beginning. In this case, the target region 44 may be a rectangular region surrounding the region 54. By performing the aforementioned processes again, the region determination unit 32 causes the template storage unit 9 to store a region corresponding to the degree-of-separation maximum distance dmax as a template.

Assume that the new target region obtained as a result of performing the aforementioned processes again is, for example, the region 54 illustrated in FIG. 6. In this case, a region 60, which is a set of small regions 45 with a Mahalanobis distance d from the centroid 50 that is within the degree-of-separation maximum distance dmax as illustrated in FIG. 6, is registered as a template. In this example, for the sake of description, the new target region obtained after performing the processes again is the same as the initially obtained target region, but the new target region is not necessarily the same as the initially obtained target region.

Figure 7:
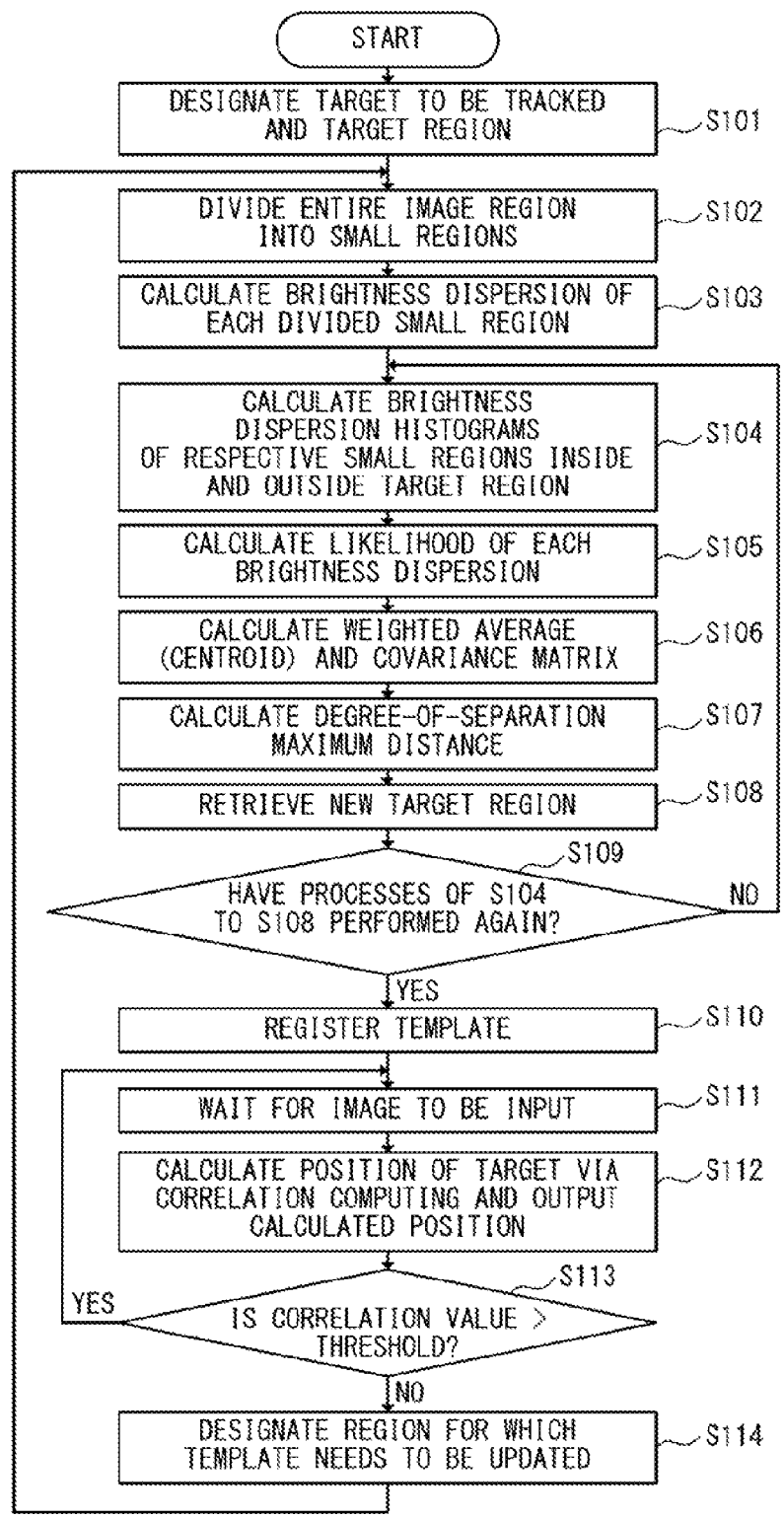
FIG. 7 is a flowchart illustrating operations of the image processing system in accordance with the first embodiment.

In the following, operations of the image processing system 1 in accordance with the first embodiment will be further described by mainly referring to FIG. 7. FIG. 7 is a flowchart illustrating operations of the image processing system 1 in accordance with the first embodiment.

As described above with reference to FIG. 1, to designate the target 42 desired to be traced, the user first sets up, for example, a rectangular region surrounding the target 42 within an image 40 displayed by a display apparatus (not illustrated) by using, for example, a mouse apparatus (not illustrated). In the image processing system 1, the target region designation unit 17 designates the rectangular region designated by the user as the target region 44 (S101).

As described above with reference to FIG. 2, the characteristic value calculation unit 22 divides the image 40 into a plurality of regions 45 that are centered around the coordinates (x,y) and that are smaller than the target region (S102). The characteristic value calculation unit 22 calculates a brightness dispersion Var (x,y) in accordance with formula 1 for each small region 45 (S103).

As described above with reference to FIG. 3, the histogram calculation unit 24 determines brightness dispersion histograms of small regions 45 for the inside and outside of the target region 44 (S104). As described above with reference to FIG. 4, the likelihood calculation unit 26 calculates likelihoods $\rho(i)$ in accordance with formula 2 according to the calculated histograms (S105). Using the likelihoods $\rho(i)$ calculated by formula 2, the centroid and covariance calculation unit 28 determines a centroid weighted in accordance with formula 3 by the likelihoods $\rho(i)$ of the central coordinates of small regions 45 within the target region 44, and determines a covariance matrix (S106).

As described above with reference to FIG. 5, the degree-of-separation detection unit 30 calculates a Mahalanobis distance d from the centroid (coordinates (xg,yg)) to the central coordinates (xp,yp) of each small region 45 in accordance with formulae 5 and 6. As in the case of the processes described with reference to FIG. 2 and FIG. 3, the degree-of-separation detection unit 30 calculates frequencies Wd1(i) and Wd2(i) of the brightness dispersion histograms for inside and outside the target region that are based on the selected Mahalanobis distance d, and the degree-of-separation detection unit 30 determines a degree of separation $\alpha(d)$ in accordance with formula 7. The degree-of-separation detection unit 30 determines the degree-of-separation maximum distance dmax with the maximum degree of separation $\alpha(d)$ (S107).

As described above with reference to FIG. 6, the region determination unit 32 retrieves, as a new target region, a region with a Mahalanobis distance d from the centroid that is equal to or less than the degree-of-separation maximum distance dmax (S108). The region determination unit 32 determines whether or not the aforementioned processes of S104 to S108 for retrieving the new target region have been performed again (S109), and, when those processes have not yet been performed again (NO in S109), the process returns to S104 and the processes up to S108 are performed again. When it is determined that the processes have been performed again (YES in S109), the region determination unit 32 registers, as a template, a region corresponding to the degree-of-separation maximum distance dmax (in the case of the example illustrated in FIG. 6, this region corresponds to the region 54) in the template storage unit 9 (S110).

In the following, as the process for tracking the target 42, the image processing apparatus 5 waits for an image of a next frame to be input to the input image storage unit 7 from the camera 3 (S111). For the new image that has been input, the correlation computing unit 11 calculates a correlation with the template registered via the processes up to S110. Accordingly, the correlation computing unit 11 calculates, as a track position 70, the position of the target 42 within the new image that has been input, and the position output unit 15 outputs the track position 70 to, for example, a display unit (not illustrated) (S112).

The update determination unit 13 determines whether or not a correlation value calculated by the correlation computing unit 11 is higher than a threshold that is set in advance (S113). When the calculated correlation value is higher than the threshold set in advance, the update determination unit 13 determines that the template registered in the template storage unit 9 is adequate, and the process returns to S111 to continue tracking the target 42 (YES in S113). When the calculated correlation value is equal to or lower than the threshold set in advance, the update determination unit 13 determines that a change has been made in the image and determines that the template registered in the template storage unit 9 needs to be updated (NO in S113). In this case, the update determination unit 13 designates, as a new target region 44, a rectangular region surrounding a region currently designated as a template (114) and performs the processes from S102 again.

As described above, the image processing system 1 in accordance with the first embodiment updates a template when the correlation value between an obtained image and the template becomes equal to or lower than a certain value due to, for example, movement of the target 42 to be tracked. A template is a set of small regions 45 with a Mahalanobis distance d from a centroid that is based on the central coordinates of the small regions 45, the Mahalanobis distance being within the degree-of-separation maximum distance dmax that has the maximum degree of separation $\alpha(d)$ calculated according to a brightness dispersion of each small region 45. The processes from S104 to S108 for retrieving a new template according to a brightness dispersion are preferably performed twice.

As described above, in accordance with the image processing system 1 in accordance with the first embodiment, when, for example, a ship is photographed as a target 42 from a moving aircraft, it is possible to prepare adequate treatments even if the size, direction, or the like of the target 42 changes due to the positions of the aircraft and the ship. That is, according to information from which, as much as possible, the influence of factors other than the target 42 has been removed, a template may be updated on an as-needed basis. As a result, it is also possible to prevent the target 42 from being lost sight of.

The image processing system 1 in accordance with the first embodiment updates a template according to a degree of separation of a brightness dispersion histogram. In this way, the size of a target region is determined so that regions with different brightness dispersions can be separated, thereby enabling template updating that automatically deals with both a change in brightness and a change in a shape, with the result that it is possible to perform target tracking that deals with both a change in brightness and a change in a shape. Accordingly, a change in brightness due to an illumination condition is automatically considered.

When a target region 44 is designated and the process for determining a new target region is performed in the first attempt, the new target region is extracted according to the target region 44, which includes a small region 45 whose distance from a centroid to a center point is greater than the degree-of-separation maximum distance dmax. Accordingly, for an extracted target region, similar processes are performed again to extract a target region, enabling the influence of a small region 45 exceeding the degree-of-separation maximum distance dmax to be removed, and hence it is possible to update the template more adequately. A brightness value may be the combination brightness of the colors of a color image.

(Second embodiment) In the following, an image processing system in accordance with a second embodiment will be described by mainly referring to FIG. 8 to FIG. 10. In the second embodiment, descriptions will not be given of components and operations similar to those in the first embodiment.

The configuration of the image processing system in accordance with the second embodiment is similar to that of the image processing system 1 in accordance with the first embodiment. In the second embodiment, the average values of H components (hue) and S components (saturation) within a Hue Saturation Value (HSV) color space of each pixel are calculated as characteristic amounts. Such average values are preferably used in a situation in which a characteristic notably emerges in a color component, such as a situation in which a color, e.g., skin color of a person's face, is seen at a wide portion of a target but is rarely seen at a portion around this target.

Figure 8A:
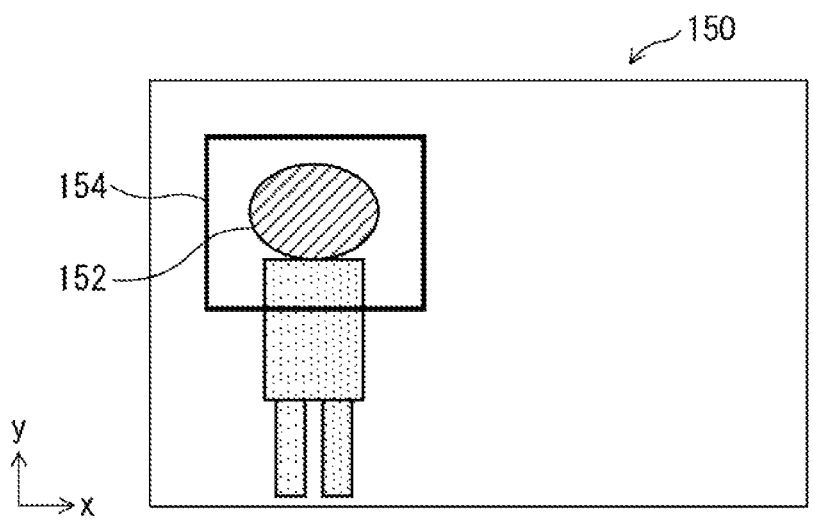
FIG. 8A illustrates an example of designation of a target region of an image in accordance with a second embodiment.
Figure 8B:
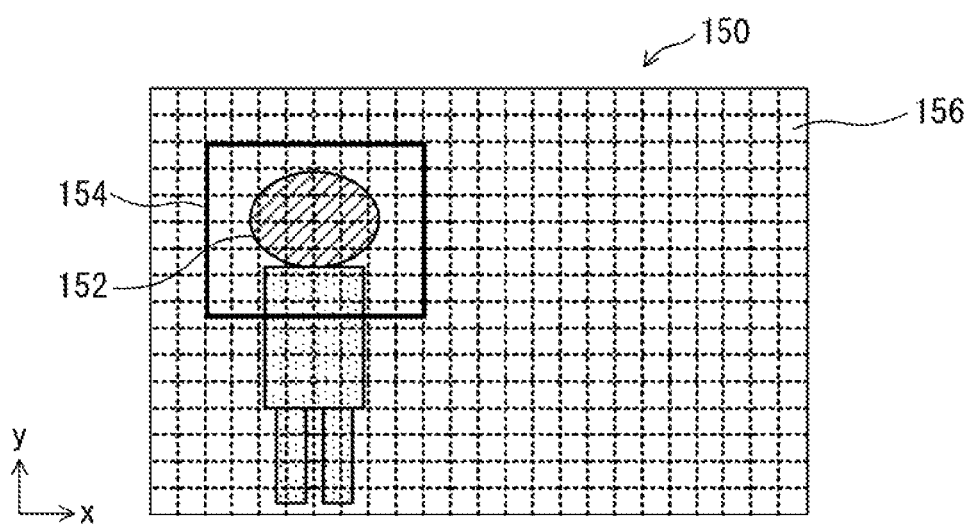
FIG. 8B illustrates an example in which an image is divided into a plurality of small regions in accordance with the second embodiment.

FIG. 8 illustrates an image in accordance with the second embodiment, wherein FIG. 8A illustrates an example of designation of a target region and FIG. 8B illustrates an example in which an image is divided into small regions. As illustrated in FIG. 8A, first, by using, for example, a mouse apparatus (not illustrated), a user sets up, within an image 150 displayed by a display apparatus (not illustrated), a rectangular region surrounding a target 152 desired to be traced. In the image processing system 1, the target region designation unit 17 designates the rectangular region designated by the user as a target region 154. The target 152 in the present embodiment is a person's face, and the target region 154 thus includes a large amount of skin color in comparison with the other regions of the image 150.

As illustrated in FIG. 8B, the characteristic value calculation unit 22 divides the image 150 into a plurality of small regions 156 that are centered around the coordinates (x, y) and that are smaller than the target region 44. For each small region 156, the characteristic value calculation unit 22 calculates an average Have (x, y) of H components and an average Save (x,y) of S components in accordance with the following formula 8.

$$\text{Have}(x, y) = \left( \frac{1}{N} \sum_{k=1}^{N} h(k) \right) \qquad \text{(Formula 8)}$$

$$\text{Save}(x, y) = \left( \frac{1}{N} \sum_{k=1}^{N} s(k) \right)$$

In formula 8, N represents the number of pixels of a small region 156, and h(k) and s(k) respectively represent the values of H components and S components of the k-th pixel (k is an integer from 1 to N) from among pixels within the small region 156 to which the numbers 1 to N are assigned for convenience.

Next, the histogram calculation unit 24 determines an H component histogram and an S component histogram of the small regions 156 for inside and outside of the target region 154. FIG. 9 illustrate an example of an H component histogram and an example of an S component histogram, wherein FIG. 9A illustrates the histogram for inside the target region 154, and FIG. 9B illustrates the histogram for outside the target region 154.

In FIG. 9, the horizontal axis represents an HS value using the combination of an H component and an S component, and the vertical axis represents a frequency. In the following example, H components are classified into three levels and S components are classified into three levels, and these classified components are combined to generate 3×3=9 levels of indexes as "HS values hs=1 to 9". As an example, hs=1 corresponds to a small region 156 having an average of H components and an average of S components, both of which area first level, and hs=2 corresponds to a small region 156 having an average of H components which is the first level and an average of S components which is a second level. The frequency is a value obtained by normalizing the number of small regions 156 each having an HS value in such a manner that the sum total of frequencies becomes "1". In this example, frequency W1(hs) indicates frequencies within the target region 154, and frequency W2(hs) indicates frequencies outside the target region 154. The index of HS values is not limited to nine. Any combination of an H component and an S component may be associated with each HS value hs.

Figure 10:
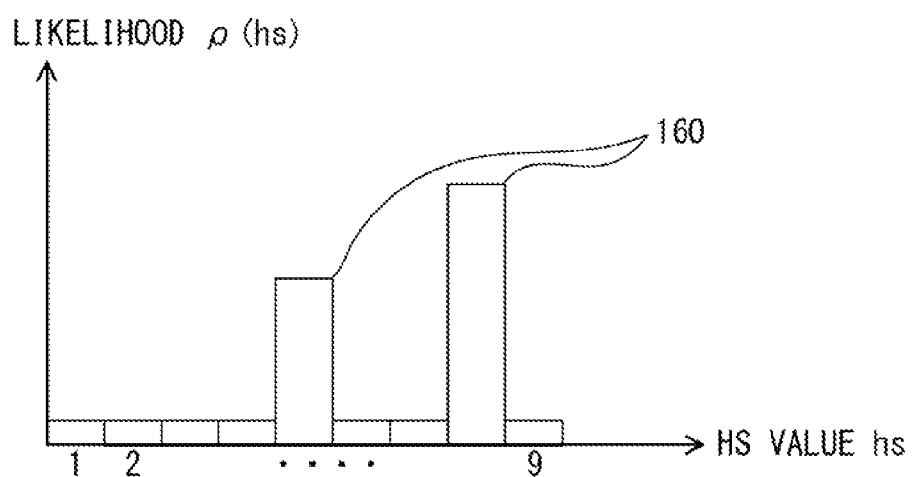
FIG. 10 illustrates a likelihood of each HS value in accordance with the second embodiment.

FIG. 10 illustrates likelihoods ρ(hs) of HS values. The likelihood calculation unit 26 calculates a likelihood ρ(hs) in accordance with the following formula, 9.

$$\rho(hs) = \ln(W1(hs)/W2(hs)) \qquad \text{Formula (9)}$$

In FIG. 10, the horizontal axis indicates HS value hs. The vertical axis indicates the likelihood ρ(hs) calculated by formula 9 in accordance with an HS value. In this example, a great likelihood ρ(hs) such as likelihood 160 represents the characteristic of the color of the target region 154, and, in the present embodiment, a greater likelihood ρ(hs) indicates a greater likelihood of being skin color.

Next, using the likelihood ρ(hs) calculated by formula 9, the centroid and covariance calculation unit 28 determines a centroid weighted by the likelihoods ρ(hs) of the center coordinates of small regions 156 inside the target region 154, and determines a covariance matrix. That is, the centroid and covariance calculation unit 28 assigns the likelihood ρ(hs) calculated by formula 9 according to the HS value of each small region 156 to the center coordinates (x,y) of each small region 156. When, for example, the HS value of the center coordinates (xp,yp) of a small region 156 to which a number p (p is an integer that is one or greater) is assigned for convenience belongs to, for example, hs=1, the centroid and covariance calculation unit 28 assigns a likelihood ρ(hs) corresponding to hs=1 to the center coordinates (xp, yq). This assigned likelihood ρ(hs) will hereinafter be referred to as a likelihood ρ(p). When the number of small regions 156 within the target region 154 is represented as M (M is a positive integer), p is an integer that is 1≤p≤M. Accordingly, as in the case of the first embodiment, the coordinates of the centroid (xg,yg) are calculated in accordance with formula 3.

In the following processes, as in the case of the first embodiment, a covariance matrix A is calculated in accordance with formula 4, and a Mahalanobis distance d is calculated in accordance with formulae 5 and 6. The degree-of-separation detection unit 30 judges, to be included in a target region, a region with a Mahalanobis distance d from the calculated centroid that is equal to or less than a predetermined value and judges, to be located outside the target region, a region with a Mahalanobis distance d from the centroid that is greater than the predetermined value. The degree-of-separation detection unit 30 then performs processes similar to those described with reference to FIG. 9. That is, the degree-of-separation detection unit 30 determines a frequency Wd1(hs) of the histogram of the HS values of the small regions 156 inside the target region (the total sum of frequencies is normalized by 1) and a frequency Wd2(hs) of the histogram of the HS values of the small regions 156 outside the target region (the total sum of frequencies is normalized by 1).

Next, using the obtained result, the degree-of-separation detection unit 30 determines a degree of separation of the frequency Wd1(hs) and the frequency Wd2(hs). The degree of separation α(d) is determined in accordance with the following formula, 10.

$$\alpha(d) = 1 - \sum_{hs=1}^{9} \sqrt{Wd1(hs) \times Wd2(hs)} \quad \text{(Formula 10)}$$

The degree-of-separation detection unit 30 performs the aforementioned processes according to a plurality of Mahalanobis distances d (d=1, 2, 3, 4, in this example) and determines a degree-of-separation maximum distance dmax, which is a Mahalanobis distance with the maximum degree of separation α(d) from among the degrees of separation α(d) calculated by formula 7. The region determination unit 32 defines, as a new target region, a region with a Mahalanobis distance d that is within the degree-of-separation maximum distance dmax.

In the following processes, as in the case of the processes in the first embodiment, the target region designation unit 17 designates, as a new target region 154, the new target region extracted through the aforementioned processes and performs again the aforementioned processes for determining a target region. By performing the aforementioned processes, the region determination unit 32 causes the template storage unit 9 to store, as a template, a set of small regions 156 that depends on a region corresponding to the degree-of-separation maximum distance dmax.

As described above, the image processing system 1 in accordance with the second embodiment updates a template when the correlation value between an obtained image and the template becomes equal to or lower than a certain value due to, for example, movement of the target 152 to be tracked. A template is a small region 156 with a Mahalanobis distance d from a centroid calculated according to the HS value of each small region 156, the Mahalanobis distance d being within the degree-of-separation maximum distance dmax having the maximum degree of separation α(d). The processes for retrieving a new template according to an HS value are preferably performed twice.

As described above, in accordance with the image processing system 1 in accordance with the second embodiment, when, for example, a moving target 152 is photographed, it is possible to prepare adequate treatments even if the size, direction, or the like of the target 152 changes. That is, according to information from which, as much as possible, the influence of factors other than the target 152 has been removed, a template may be updated on an as-needed basis. As a result, it is also possible to prevent the target 152 from being lost sight of.

The image processing system 1 in accordance with the second embodiment updates a template according to a degree of separation of a color component histogram of an image. In this way, the size of a target region is determined according to regions with different color components, thereby enabling template updating that automatically deals with a change in a shape caused by movement of the target 152, with the result that it is possible to perform target tracking that deals with a change in a shape caused by movement of the target 152. Accordingly, a change in color components of the entire screen caused by an illumination condition is automatically considered.

When a target region 154 is designated and the process for determining a new target region is performed in the first attempt, the new target region is extracted according to the target region 44, which includes a small region 156 whose distance from a centroid to a center point is greater than the degree-of-separation maximum distance dmax. Accordingly, for an extracted target region, similar processes are performed again to extract a target region, enabling the influence of a small region 156 exceeding the degree-of-separation maximum distance dmax to be removed, and hence it is possible to update the template more adequately.

As described above, an image processing apparatus, an image processing system, and a recording medium recording a program are provided which are capable of updating a template so that a target can be detected even if a change is made in, for example, the position, size, or brightness of the image of the target.

The present invention is not limited to the aforementioned embodiments, and various configurations or embodiments may be employed without changing the spirit of the present invention. A brightness dispersion or an HS value were exemplarily described as a characteristic value, but, as long as a characteristic value represents a characteristic of an image, the value may be another characteristic value or a calculated value. Although it was stated that the process for extracting a new target region is performed twice, the number of times this process is performed is not limited to twice. Performing the process three times or more further improves the precision of extraction of a region. Performing the process only once also allows a template to be extracted in consideration of the size and direction of a target 42 and an illumination condition.

Here, descriptions will be given of an example of a computer commonly applied to cause a computer to perform the operations of the image processing methods in accordance with the first and second embodiments. FIG. 11 is a block diagram illustrating an exemplary hardware configuration of a typical computer. As illustrated in FIG. 11, a central processing unit (CPU: processor) 302, a memory 304, an input apparatus 306, an output apparatus 308, an external storage apparatus 312, a medium drive apparatus 314, a network connecting apparatus, and the like are connected to a computer 300 via a bus 310.

The CPU 302 is an arithmetic processing unit that controls operations of the entirety of the computer 300. The memory 304 is a storage unit in which a program for controlling operations of the computer 300 is stored in advance and which is used as a work area if necessary in executing the program. The memory 304 is, for example, a random access memory (RAM) or a read only memory (ROM). When the input apparatus 306 is operated by a computer user, the input apparatus 306 obtains the input of various pieces of information corresponding to the operation from the user and sends the obtained information to the CPU 302, and the input apparatus 306 is, for example, a keyboard apparatus or a mouse apparatus. The output apparatus 308 is an apparatus that outputs the result of processing by the computer 300 and includes, for example, a display apparatus. The display apparatus displays, for example, a text or image in accordance with display data sent by the CPU 302.

The external storage apparatus 312 is, for example, a storage apparatus such as a hard disk or is an apparatus that stores, for example, obtained data and various control programs executed by the CPU 302. The medium drive apparatus 314 is an apparatus for writing data in and reading data from a portable recording medium 316. The CPU 302 may perform various control processes by reading a predetermined control program stored by the portable recording medium 316 via the recording medium drive apparatus 314 and by executing this read control program. The portable recording medium 316 is, for example, a compact disc (CD)-ROM, a digital versatile disc (DVD), or a universal serial bus (USB) memory. A network connecting apparatus 318 is an interface apparatus that manages exchanging of various data with an external element performed in a wired or wireless fashion. The bus 310 is a communication path that connects, for example, the aforementioned apparatuses to each other and that is used to exchange data.

A program for causing a computer to perform the image processing methods in accordance with the first and second embodiments is stored in, for example, the external storage apparatus 312. The CPU 302 reads a program from the external storage apparatus 312 and causes the computer 300 to perform an operation of image processing. In this case, first, a control program for causing the CPU 302 to perform image processing is created and stored in the external storage apparatus 312. A predetermined instruction is then given from the input apparatus 306 to the CPU 302 in order to execute the control program by reading this control program from the external storage apparatus 312. This program may be stored in the portable recording medium 316.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An image processing apparatus that updates a template for tracking a target, the image processing apparatus comprising:
   a processor that designates a target region including the target within an image including the target;
   calculates a centroid and a covariance matrix which depends on the centroid, the centroid being obtained by weighting central coordinates of each of a plurality of small regions by a likelihood of each of the plurality of small regions, the plurality of small regions being divisions of the image which are smaller than the target region, the likelihood being based on histograms of characteristic values of respective small regions inside and outside the target region;
   detects a degree of separation indicating a degree of separation of a region within the image from another region according to the histograms, the likelihood, the centroid, and the covariance matrix; and
   determines, according to the degree of separation, a post-update target region designated as the template after an update.

2. The image processing apparatus according to claim 1, wherein
   the characteristic value is a brightness dispersion.

3. The image processing apparatus according to claim 1, wherein
   the characteristic value is a color brightness average.

4. The image processing apparatus according to claim 1, wherein
   the likelihood is based on a ratio between frequencies of emergence of the characteristic value for each predetermined range inside and outside the target region.

5. An image processing method for updating a template for tracking a target, the image processing method comprising:
   designating a target region by a processor including the target within the image;
   calculating a centroid and a covariance matrix that depends on the centroid by the processor, the centroid being obtained by weighting central coordinates of each of a plurality of small regions by a likelihood of each of the plurality of small regions, the plurality of small regions being divisions of the image which are smaller than the target region, the likelihood being based on histograms of characteristic values of respective small regions inside and outside the target region;
   detecting a degree of separation by the processor for separating a certain region from another region according to the histograms, the likelihood, the centroid, and the covariance matrix; and
   determining, according to the degree of separation, a post-update target region designated as the template after an update by the processor.

6. The image processing method according to claim 5, wherein
   under a condition in which the post-update target region is the target region, a process for calculating the centroid and the covariance matrix, a process for detecting a degree of separation, and a process for determining a new post-update target region are further repeated.

7. The image processing method according to claim 5, wherein
   the characteristic value is a brightness dispersion.

8. The image processing method according to claim 5, wherein
   the characteristic value is a color brightness average.

9. The image processing method according to claim 5, wherein
   the likelihood is based on a ratio between frequencies of emergence of the characteristic value for each predetermined range inside and outside the target region.

10. A non-transitory computer-readable recording medium having stored therein a program for causing a computer to perform a process when a template for tracking a target is updated, the process comprising:
    designating a target region including the target within an image including the target;
    calculating a centroid and a covariance matrix that depends on the centroid, the centroid being obtained by weighting central coordinates of each of the plurality of small regions by a likelihood of each of the plurality of small regions, the plurality of small regions being divisions of the image which are smaller than the target region, the likelihood being based on histograms of characteristic values of respective small regions inside and outside the target region;
    detecting a degree of separation for separating a certain region from another region according to the histograms, the likelihood, the centroid, and the covariance matrix; and
    determining, according to the degree of separation, a post-update target region designated as the template after an update.

11. The computer-readable recording medium according to claim 10, wherein
    under a condition in which the post-update target region is the target region, the calculating the centroid and the covariance matrix, the detecting a degree of separation, and the determining a new post-update target region are further repeated.

12. The computer-readable recording medium according to claim 10, wherein the characteristic value is a brightness dispersion.

13. The computer-readable recording medium according to claim 10, wherein the characteristic value is a color brightness average.

14. The computer-readable recording medium according to claim 10, wherein the likelihood is based on a ratio between frequencies of emergence of the characteristic value for each predetermined range inside and outside the target region.

* * * * *